United States Patent
Joshi et al.

(10) Patent No.: US 10,009,632 B2
(45) Date of Patent: Jun. 26, 2018

(54) FLICKER DETECTION AND MITIGATION IN VIDEO CODING

(71) Applicant: QUALCOMM Incorporated, San Diego, CA (US)

(72) Inventors: Rajan Laxman Joshi, San Diego, CA (US); Xiang Li, San Diego, CA (US); Marta Karczewicz, San Diego, CA (US); Krishnakanth Rapaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/638,965

(22) Filed: Mar. 4, 2015

(65) Prior Publication Data
US 2015/0256857 A1 Sep. 10, 2015

Related U.S. Application Data

(60) Provisional application No. 61/948,469, filed on Mar. 5, 2014.

(51) Int. Cl.
*H04N 19/11* (2014.01)
*H04N 19/13* (2014.01)
*H04N 19/14* (2014.01)
*H04N 19/154* (2014.01)
*H04N 19/176* (2014.01)
*H04N 19/463* (2014.01)
*H04N 19/86* (2014.01)
(Continued)

(52) U.S. Cl.
CPC ............ *H04N 19/86* (2014.11); *H04N 19/11* (2014.11); *H04N 19/13* (2014.11); *H04N 19/14* (2014.11); *H04N 19/154* (2014.11); *H04N 19/172* (2014.11); *H04N 19/176* (2014.11); *H04N 19/463* (2014.11); *H04N 19/27* (2014.11)

(58) Field of Classification Search
CPC ........ H04N 19/11; H04N 19/13; H04N 19/14; H04N 19/154; H04N 19/172; H04N 19/176; H04N 19/27; H04N 19/463; H04N 19/86
USPC .................................................... 375/240.02
See application file for complete search history.

(56) References Cited

U.S. PATENT DOCUMENTS

| | | | |
|---|---|---|---|
| 9,596,479 B2 * | 3/2017 | Liu | ........................ H04N 19/50 |
| 2007/0036213 A1 * | 2/2007 | Matsumura | .......... H04N 19/139 |
| | | | 375/240.03 |

(Continued)

FOREIGN PATENT DOCUMENTS

WO 2013086530 A2 6/2013

OTHER PUBLICATIONS

Yang et al., "Effective Flicker Removal from Periodic Intra Frames and Accurate Flicker Measurement", IEEE, Oct. 12, 2008.*

(Continued)

*Primary Examiner* — Jamie Atala
*Assistant Examiner* — James Boylan
(74) *Attorney, Agent, or Firm* — Shumaker & Sieffert, P.A.

(57) ABSTRACT

A device configured to code video data includes: a memory configured to store video data, and at least one processor. The at least one processor is configured to: code information indicating whether a block from a current picture will flicker. A determination of whether the block from the current picture will flicker is based on the block in the current picture in a display order and a collocated block from a next picture in the display order.

19 Claims, 5 Drawing Sheets

US 10,009,632 B2
Page 2

(51) Int. Cl.
*H04N 19/172* (2014.01)
*H04N 19/27* (2014.01)

(56) References Cited

U.S. PATENT DOCUMENTS

| | | | | |
|---|---|---|---|---|
| 2007/0285285 | A1* | 12/2007 | Puri | H04N 19/105 341/50 |
| 2008/0025397 | A1* | 1/2008 | Zhao | H04N 19/172 375/240.13 |
| 2010/0315557 | A1* | 12/2010 | Mathew | H04N 19/132 348/607 |
| 2011/0182356 | A1* | 7/2011 | Ammu | H04N 19/197 375/240.24 |
| 2011/0216828 | A1* | 9/2011 | Yang | H04N 7/0132 375/240.12 |
| 2012/0230417 | A1* | 9/2012 | Sole Rojals | H04N 19/00109 375/240.18 |
| 2013/0148740 | A1* | 6/2013 | Samanta Singhar | H04N 19/507 375/240.24 |
| 2013/0322539 | A1* | 12/2013 | Li | H04N 19/105 375/240.16 |
| 2014/0016703 | A1* | 1/2014 | Denoual | H04N 19/00696 375/240.16 |
| 2014/0192862 | A1* | 7/2014 | Flynn | H04N 19/00569 375/240.03 |
| 2014/0307779 | A1* | 10/2014 | Chono | H04N 19/00884 375/240.02 |
| 2016/0212446 | A1* | 7/2016 | Liu | H04N 19/597 |
| 2016/0254028 | A1* | 9/2016 | Atkins | H04N 5/147 386/241 |

OTHER PUBLICATIONS

Kuszpet et al., "Post-Processing for Flicker Reduction in H.264/AVC", Nov. 7, 2007.*
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union. Apr. 2013, 317 pp.
ITU-H.265, Series H: Audiovisual and Multimedia Systems, Infrastructure of audiovisual services—Coding of moving video, High efficiency video coding, The International Telecommunication Union. Oct. 2014, 540 pp.
ITU-H.265, Series H: Audiovisual and Multimedia Systems, Infrastructure of audiovisual services—Coding of moving video, High efficiency video coding, The International Telecommunication Union. Apr. 2015, 634 pp.
Bross et al., "High Efficiency Video Coding (HEVC) text Specification draft 10 (for FDIS & Consent)," JCT-VC Meeting; MPEG Meeting; Jan. 14-23, 2013; Geneva; (Joint Collaborative Team on Video Coding of ISO/IEC JTC1/SC29/WG11 and ITU-T SG.16); Retrieved from the Internet URL :http://wftp3.itu.int/av-arch/jctvc-site/, no. JCTVC-_1003_v1, XP030113948, Jan. 17, 2013, 321 pp.
Chen et al., "Description of screen content coding technology proposal by Qualcomm," JCT-VC Meeting; Valencia, Mar. 27-Apr. 4, 2014, (Joint Collaborative Team on Video Coding of ISO/IEC JTC1/SC29/WG11 and ITU-T SG.16), no. JCTVC-Q0031, XP030115915, Mar. 18, 2014, 18 pp.
International Search Report and Written Opinion—PCT/US2015/018966—ISA/EPO—May 8, 2015, 14 pp.
Kuszpet et al., "Post-Processing for Flicker Reduction in H.264/AVC," 26th Picture Coding Symposium, XP030080468, Nov. 7-9, 2007, 4 pp.
Yang et al., "Effective flicker removal from periodic intra frames and accurate flicker measurement," 15th IEEE International Conference on Image Processing : ICIP 2008, XP031374640, ISBN: 978-1-4244-1765-0, Oct. 12-15, 2008, pp. 2868-2871.
Yu et al., "AHG8: More investigation on screen content coding," JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, no. JCTVC-M0320, XP030114277, Apr. 16, 2013, 13 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2010, 669 pp.
Chono et al., "Detented Quantization to Suppress Flicker Artifacts in Periodically Inserted Intra-Coded Pictures in H.264 Video Coding," 2006 International Conference on Image Processing, ICIP 2006, Oct. 8-11, 2006, pp. 1713-1716.
Chun et al., "Intra Prediction Mode Selection for Flicker Reduction in H.264/AVC," IEEE Transactions on Consumer Electronics, vol. 52, No. 4, Nov. 27, 2006, pp. 1303-1310.
Fan et al., "Flicking Reduction in All Intra Frame Coding," Joint Video Team (JVT) of ISO/IEC MPEG & ITU-T VCEG (ISO/IEC JTC1/SC29/WG11 and ITU-T SG16 Q.6), 5th Meeting: Geneva, Switzerland, JVT-E070, Oct. 9-17, 2002, 8 pp.
Chen et al., "Description of screen content coding technology proposal by Qualcomm," Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, JCTVC-Q0031, Mar. 4, 2015, 19 pp.

(56) References Cited

OTHER PUBLICATIONS

Second Written Opinion of International Application No. PCT/US2015/018966, dated Mar. 4, 2016, 6 pp.

Response to Written Opinion dated Mar. 24, 2014, from International Application No. PCT/US2015/018966, dated Jan. 5, 2016, 6 pp.

Response to Second Written Opinion dated Mar. 4, 2016, from International Application No. PCT/US2015/018966, filed on May 3, 2016, 7 pp.

International Preliminary Report on Patentability from International Application No. PCT/US2015/018966, dated Jun. 21, 2016, 9 pp.

\* cited by examiner

FLICKER DETECTION AND MITIGATION IN VIDEO CODING

This application claims priority to U.S. Provisional Application No. 61/948,469, filed Mar. 5, 2014, the entirety of which is incorporated herein by reference.

TECHNICAL FIELD

This disclosure relates to video coding and/or video processing, such as encoding and decoding of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4. ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for detecting and mitigating flickering in video data. Flickering is a visual artifact, which may arise in video coding due to the choice of coding modes and temporal characteristics. For example, flickering is typically observed when the video sequence is coded at low bit-rates using only I-slices, e.g. in intra-prediction mode. A video coder (i.e. video encoder or a video decoder) configured in accordance with the techniques of this disclosure may use various metrics that compare a block of a current frame with a block of a previous frame to determine whether the block will flicker after being decoded by a video decoder.

The techniques of this disclosure may be performed by a video coder to mitigate flickering. A video coder may attempt to mitigate flickering by constraining coding tools, such as coding modes, for a block of video data that the video coder determines will flicker. As an example, a video encoder or decoder may constrain a flickering block to an intra-prediction mode, or may prohibit the use of intra-block coding (intra-BC) for the block. In some cases, the techniques of this disclosure merely identify a flickering (or potentially flickering block) so that additional video processing steps can be taken, if desired.

Additional techniques of this disclosure relate to techniques for coding (i.e. encoding or decoding) information that indicates that a particular region of a picture will flicker. The coded information may comprise, for example, a flickering flag that indicates that a flickering region. A video encoder may encode the flickering flag and/or a decoder may infer the value of the flickering flag in various examples. Additionally, this disclosure describes techniques for improving the coding efficiency of the flickering flag.

In one example, a method of coding video data includes: coding information indicating whether a block from a current picture will flicker, wherein a determination of whether the block from the current picture will flicker is based on the block in the current picture in a display order and a collocated block from a next picture in the display order.

In another example, a device configured to code video data includes: a memory configured to store video data, and at least one processor configured to: code information indicating whether a block from a current picture will flicker, wherein a determination of whether the block from the current picture will flicker is based on the block in the current picture in a display order and a collocated block from a next picture in the display order.

In another example, a device configured to code video data includes: means for coding information indicating whether a block from a current picture will flicker, and means for determining whether the block from the current picture will flicker based on the block in the current picture in a display order and a collocated block from a next picture in the display order.

In another example, a non-transitory computer-readable storage medium includes instructions that, when executed, cause at least one processor to: code information indicating whether a block from a current picture will flicker, wherein a determination of whether the block from the current picture will flicker is based on the block in the current picture in a display order and a collocated block from a next picture in the display order.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a new developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC, referred to as "HEVC Working Draft 10" or "WD10," described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, available from: http://phenix.int-evry.fr/jct/doc_end_user/documents/12_Geneva/wg11/JCTVC-L1003-v34.zip.

The techniques of this disclosure are related to video coding, and may alleviate visual artifacts or visual discrepancies, which appear to a viewer of the video as "flickering." Flickering artifacts appear out of place to viewers of coded video data, and should be reduced or eliminated in order to improve the subjective quality of video to a viewer.

As discussed in greater detail below, the techniques of this disclosure may enable a video coder to reduce or eliminate flickering artifacts. A video encoder configured in accordance with the techniques of this disclosure may attempt to identify a region of a picture of video data that will flicker. A video encoder may identify the potentially flickering region based on differences between a block of a current picture, and a collocated block of another picture.

If the video encoder determines that a particular region may flicker, the video encoder may encode information, such as a syntax element, that indicates the flickering region. The encoded information may indicate that video decoder configured to perform a generally reciprocal decoding process should apply certain constraints to the current block in order to reduce flickering, as will be described in greater detail below.

Figure 1:
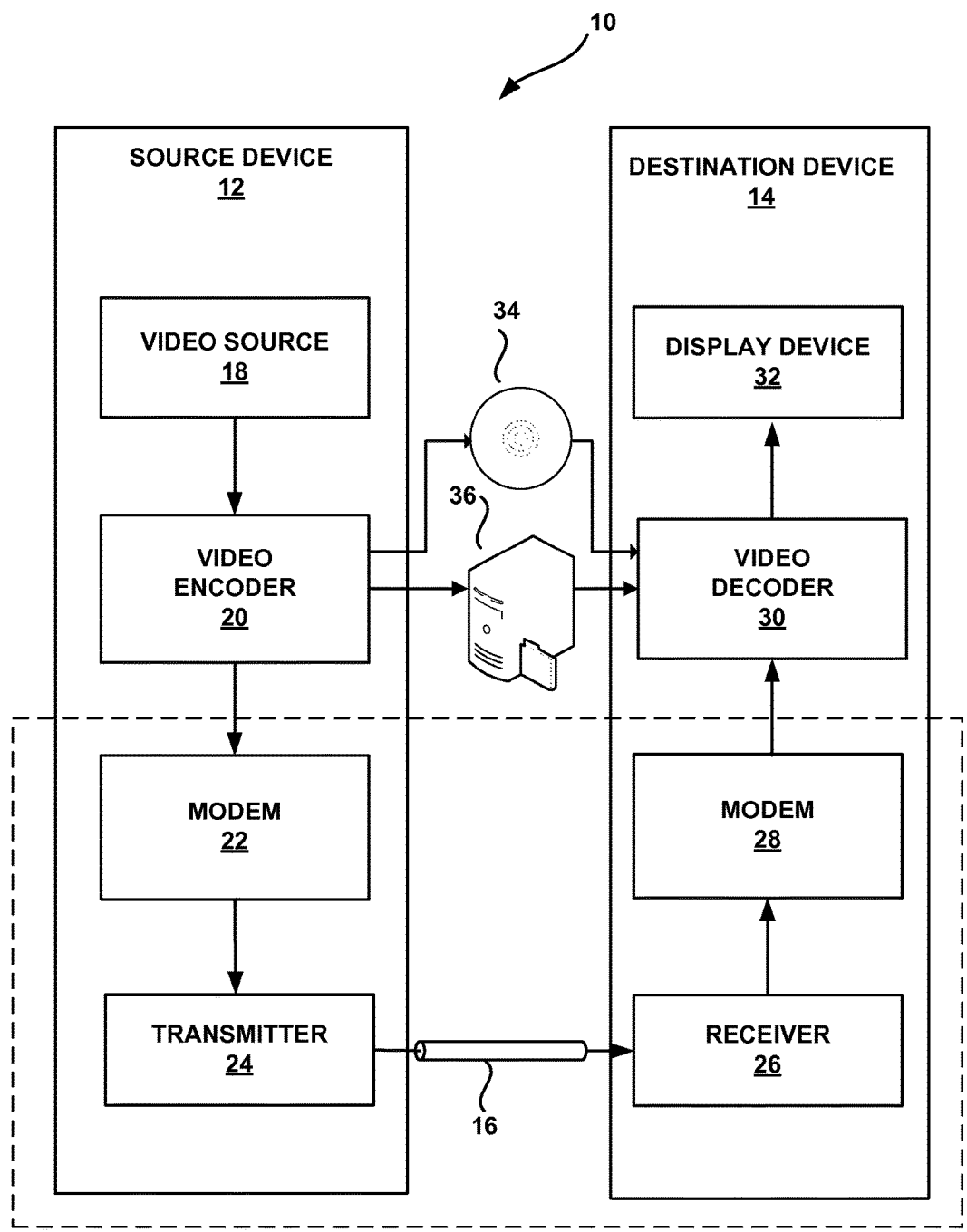
FIG. 1 is a block diagram illustrating an example video encoding and decoding system that may utilize the techniques described in this disclosure.

FIG. 1 is a block diagram illustrating an example video encoding and decoding system 10 that may be configured to utilize techniques for flicker detection and flicker mitigation in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In some examples, the techniques described in this disclosure may be particularly useful in video coding according to HEVC. However, the techniques described in this disclosure should not be considered limited to any particular video coding standard. The techniques described in this disclosure may be applicable to non-standards based video coding as well.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

Also, while storage medium 34 and file server 36 are illustrated as receiving video data from video encoder 20, in some examples, storage medium 34 and file server 36 may receive video data from transmitter 24 or some other unit, rather than video encoder 20. Similarly, while storage medium 34 and file server 36 are illustrated as outputting video data to video decoder 30, in some examples, storage medium 34 and file server 36 may output video data to receiver 26 or some other unit, rather than video decoder 30. In these examples, video decoder 30 may receive video data from receiver 26 or some other unit.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG), and/or extensions of the HEVC standard. HEVC range extensions are presently under development. A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Feb. 23, 2015, is downloadable from http://phenix.int-evry.fr/jct/doc_en-d_user/documents/12_Geneva/wg11/JCTVC-L1003-v34.zip. The entire content of HEVC WD10 is hereby incorporated herein by reference.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to a multiplexer protocol. Examples include the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Examples of a device that includes video decoder 30 include a wireless communication device, an integrated circuit (IC), and a microprocessor. Similarly, examples of a device that includes video encoder 20 include a wireless communication device, an integrated circuit (IC), and a microprocessor.

In some examples, video encoder 20 and video decoder 30 may each include one or more processors that are configured to implement the techniques described in this disclosure. The device that includes video encoder 20 or video decoder 30 may also include memory that stores video data that video encoder 20 and video decoder 30 utilize. In examples where the device that includes video encoder 20 and video decoder 30 is an IC chip or a microprocessor, the memory may be local memory of the IC chip or microprocessor, or may be the system memory of the apparatus (e.g., the wireless communication device such as a smart-phone or tablet) that includes the IC chip or microprocessor, or a combination of the local and system memory. In examples where the device that includes video encoder 20 and video decoder 30 is a wireless communication device (or other such device), the memory may be the local memory of video encoder 20 or video decoder 30, the system memory of the device that includes video encoder 20 or video decoder 30, or a combination of the local and system memory.

Video encoder 20 may implement any or all of the techniques of this disclosure for flicker detection and mitigation. Likewise, video decoder 30 may implement any or all of these techniques for flicker detection and mitigation. A video coder, as described in this disclosure, may refer to a video encoder or a video decoder. Similarly, a video coding unit may refer to a video encoder or a video decoder. Likewise, video coding may refer to video encoding or video decoding.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

The JCT-VC has developed the HEVC standard, e.g., as described in the HEVC WD10 discussed above. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes. The following section will discuss certain aspects of the HM in more detail.

For video coding according to the HEVC standard, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., under other video coding standards such as ITU-T H.264. Coding according to some of the presently proposed aspects of the HEVC standard will be described in this application for purposes of illustration. However, the techniques described in this disclosure may be useful for other video coding processes, such as processes defined according to range extensions of HEVC, H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. A TU includes a luma transform block and two chroma transform blocks. As such, any coding process discussed below that is applied to a TU, may be, in actuality, applied to the luma and chroma transform blocks.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain.

For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, Video encoder 20 may also entropy encode syntax elements associated with the encoded video data for use by video decoder 30 in decoding the video data.

Arithmetic coding is a form of entropy coding used in many compression algorithms that have high coding efficiency, because it is capable of mapping symbols to non-integer length codewords. CABAC coding may be applied to some information and bypassed for other information.

As described above, when video encoder 20 or video decoder 30 performs motion estimation, flickering artifacts may result. The process by which flickering artifacts can be detected will now be discussed. In HEVC, when coding I-slices, a video coder performs prediction based on previously reconstructed samples from the current slice. For inter-prediction of P or B-slices, the video coder may perform prediction based on previously coded pictures (past or future in display order). Although the techniques of this disclosure are described assuming that all the slices are I-slices, the techniques of this disclosure may be applicable when a video sequence is a mixture of I, P and B slices.

The difference in prediction from the current slice versus prediction based on previously-coded pictures has very different effects on the prediction residual and quantization characteristics for an I-slice as compared to quantization and prediction residuals for P and B-slices. Similarly, the prediction residual and quantization characteristics between two consecutive I-slices may also be very different because of lack of temporal prediction. The prediction residual and quantization characteristics between two consecutive I-slices being different may result in a visual artifact for I-slices, referred to as "flickering."

This disclosure proposes several techniques to address the problems described above. A video coder, such as video encoder 20, configured in accordance with the techniques of this disclosure may perform flicker detection, as well as flicker mitigation to address flickering artifacts. General flicker detection techniques of this disclosure will now be discussed.

Video encoder 20 may be configured in accordance with the techniques of this disclosure to detect the flickering of a block from a current picture (i.e. the picture of video data that is currently being coded) based on a collocated block from the previous coded picture in display order.

Video encoder 20 may determine that a video coding mode of a determined flickering block of the collocated block from a previous picture must be constrained or changed to mitigate the flickering artifact associated with the flickering block of the current picture. This is normally very difficult to achieve in a video encoder. Rather than changing the video coding modes of a previously-coded collocated block, the techniques of this disclosure may configure video encoder 20 to use an original block from the current picture and a collocated original block from a next picture in the display order of video data to determine and mitigate flickering. This disclosure refers to the current and next block in the display order as $B_{current}$ and $B_{next}$, respectively.

Video encoder 20 may determine the differences between a block of a current frame and a collocated block of the next frame in the display order. Based on the differences between a block, $B_{current}$, and the collocated block, $B_{next}$, Video encoder 20 may determine that the block of the current frame, $B_{current}$, will flicker. Video encoder 20 may determine (e.g., calculate a difference between) metrics of the block of $B_{current}$ and the collocated block of $B_{next}$. Examples of metrics that video encoder 20 may compare include: gradients, sum of absolute differences (SAD), and mean squared error (MSE). Based on the metrics, and as will be discussed in greater detail below, video encoder 20 may determine that flicker mitigation should be performed, and code information indicating that a block, $B_{current}$, the current picture, will flicker.

In some examples, the encoded information may comprise a syntax element, such as a flag that indicates a flickering region. Upon generating or setting the syntax element, video encoder 20 or video decoder 30 may perform any type of additional video processing based on the syntax element being set. Examples of additional video processing may include various types of filtering, anti-aliasing, deblocking, artifact removal, and/or any other type of video processing not explicitly described herein.

The region may include the block from the current picture, $B_{current}$, in some examples. The information indicating that the block will flicker may indicate that a certain region, such as a LCU, CTU (coding tree unit), CU, PU or a block, is a flickering region. In such regions, video encoder 20 and video decoder 30 may constrain some coding modes and/or tools, such as spatial intra prediction and intra block copy (Intra BC), in order to mitigate the flickering artifact. Additional examples of flicker mitigation techniques in accordance with the techniques of this disclosure will now be discussed.

In one example, video encoder 20 and video decoder 30 may disable spatial intra prediction in flickering regions. Video encoder 20 may indicate that spatial intra prediction is disabled by marking spatial neighboring blocks of the flickering region as unavailable for intra prediction. In another example, video encoder 20 and video decoder 30 may mark the blocks inside the flickering region as unavailable for intra prediction so that a flickering artifact caused by different transform sizes and the resulting predictions is further mitigated.

In cases where video encoder 20 marks a block as unavailable for intra-prediction, video encoder 20 and video decoder 30 may use the HEVC reference sample substitution process for intra sample prediction to fill in the unavailable samples, for example according to Section 8.4.4.2.2 of HEVC. Padding the unavailable samples may mitigate flickering at the expense of bitstream complexity. In some other examples, video encoder 20 may mark only blocks in non-flickering regions as available for intra prediction.

Various techniques related to coding the information to identify a region of flickering will now be discussed. As described above, video coding data comprises multiple different levels. Example levels of the bitstream may comprise: an LCU, CU, PU, or TU. Video encoder 20 and video decoder 30 may code the information indicating a flickering region, e.g. a flickering flag in any level of the bitstream.

In some examples of this disclosure, video encoder 20 and video decoder 30 may not perform prediction for a block marked as flickering. In such a case, the original samples are coded using transform or transform-skip mode. In this case, and if the flickering flag is coded at the CU level, video encoder 20 and video decoder 30 may code the flickering flag at the CU level, and video encoder 20 may not signal an intra-prediction mode for that CU.

In addition, if a CU is in a flickering region, video encoder 20 and video decoder 30 may apply further constraints, for example such that a CU cannot be coded as a certain mode or with certain tools, such as intra block copy, palette mode and color transform, if the CU is in a flickering region. If such constraints apply, video encoder 20 and video decoder 30 adjust the related CU/PU mode/information and signaling accordingly. Additionally, in various examples, video decoder 30 may apply additional back end processing post-decoding to further remove flickering in regions where flicker is identified.

Also as described above, video encoder 20 and video decoder 30 may be configured to code information, such as syntax elements, indicating a flickering region, using CABAC encoding and CABAC decoding, respectively. In examples in accordance with the techniques of this disclosure, video encoder 20 and video decoder 30 may CABAC code the flickering flag. Video encoder 20 and video decoder 30 may use the values of flickering flags of spatially neighboring blocks as contexts for the CABAC coding of a flickering flag.

Video encoder 20 and video decoder 30 may include a line buffer, which may comprise a memory configured to store information, such as syntax elements, associated with the CUs above the current CU. To reduce the size in memory of the line buffer, video encoder 20 may mark, and video decoder 30 may determine that the spatially neighboring blocks outside the current LCU (or CTU) are unavailable to be used as context.

In some examples, the techniques described in this disclosure may also be used in other applications, for example to increase error resilience. The techniques described in this disclosure may reduce or eliminate compounded prediction errors, as one example. In such cases, the name of the flag syntax element may be changed. However, the general techniques of this disclosure still apply.

Figure 2:
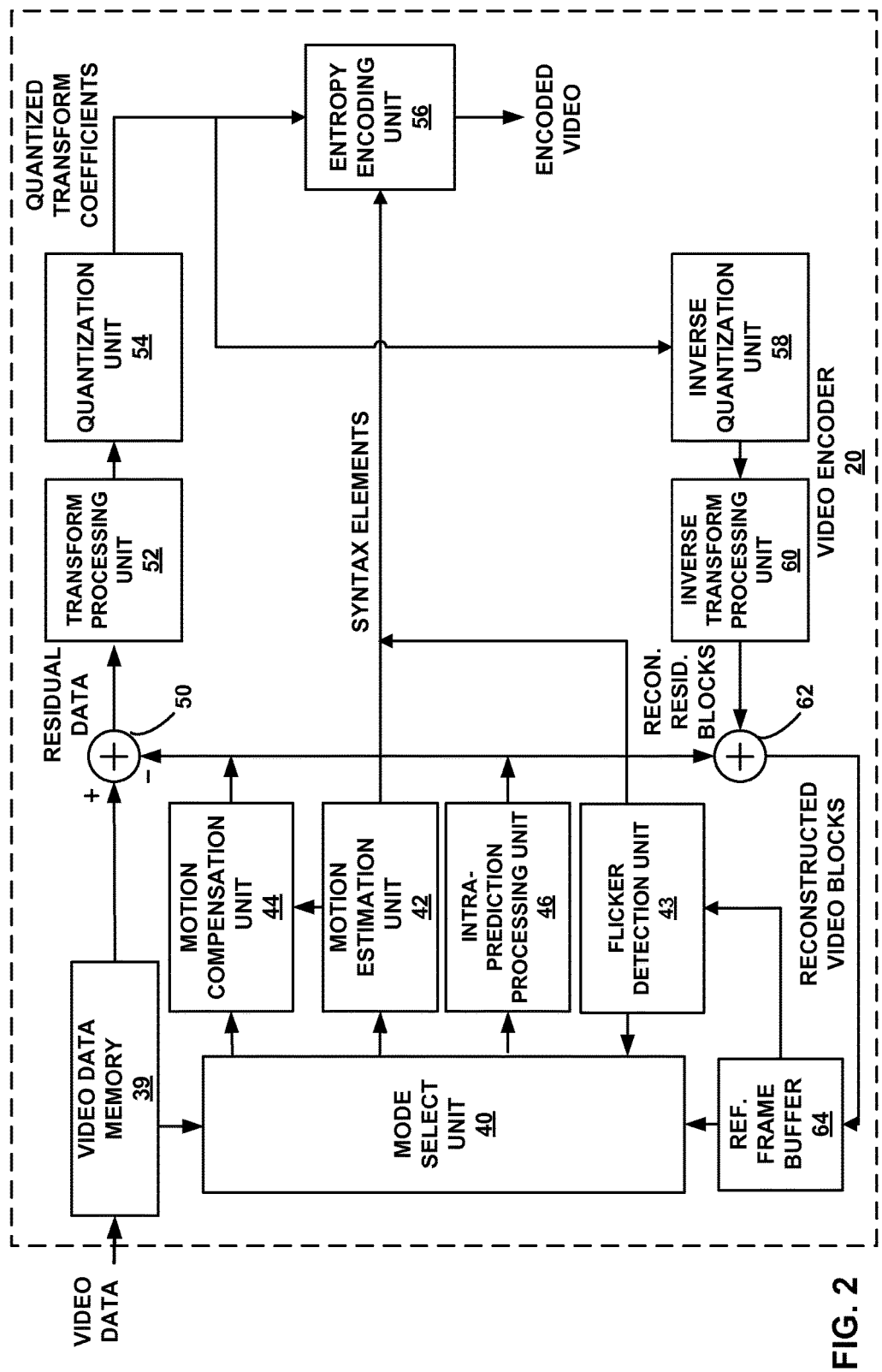
FIG. 2 is a block diagram illustrating an example video encoder that may implement the techniques described in this disclosure.

FIG. 2 is a block diagram illustrating an example of a video encoder 20 that may use techniques for flicker detection and mitigation as described in this disclosure. The video encoder 20 will be described in the context of HEVC coding for purposes of illustration, but without limitation of this disclosure as to other coding standards or methods that may require flicker detection and mitigation. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 2, video data memory 39 receives video data that is used for encoding a current video block within a video frame. Video data memory 39 may store video data to be encoded by the components of video encoder 20 (e.g., configured to store video data). The video data stored in video data memory 39 may be obtained, for example, from video source 18. Reference frame buffer 64 (also referred to as reference picture buffer 64) is one example of a decoding picture buffer (DPB that stores reference video data for use in encoding video data by video encoder 20 (e.g., in intra or inter-coding modes, also referred to as intra- or inter-prediction coding modes). Video data memory 39 and reference frame buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 39 and reference frame buffer 64 may be provided by the same memory device or separate memory devices. In various examples, video data memory 39 may be on-chip with other components of video encoder 20, or off-chip relative to those components.

In the example of FIG. 2, video encoder 20 includes a motion compensation unit 44, a motion estimation unit 42, a flicker detection unit 43, an intra-prediction processing unit 46, a reference frame buffer 64, a summer 62, a transform processing unit 52, a quantization unit 54, and an entropy encoding unit 56. Transform processing unit 52 illustrated in FIG. 2 is the unit that applies the actual transform or combinations of transform to a block of residual data, and is not to be confused with a block of transform coefficients, which also may be referred to as a transform unit (TU) of a CU. For video block reconstruction, video encoder 20 also includes an inverse quantization unit 58, an inverse transform processing unit 60, and a summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction processing unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error (i.e., distortion) results for each mode, and provides the resulting intra- or inter-predicted block (e.g., a prediction unit (PU)) to summer 50 to generate residual block data and to summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, intra-prediction processing unit 46 may perform intra-prediction encoding of a block in a P- or B-frame, e.g., when the motion search performed by motion estimation unit 42 does not result in a sufficient prediction of the block.

Motion estimation unit 42 and motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. Motion estimation unit 42 calculates a motion vector for a prediction unit of an inter-coded frame by comparing the prediction unit to reference samples of a reference frame stored in reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

Motion estimation unit 42 sends the calculated motion vector to entropy encoding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction processing unit 46 may intra-predict the received block, as an alternative to inter-prediction performed by motion estimation unit 42 and motion compensation unit 44. Intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. Intra-prediction processing unit 46 may be configured with a variety of different intra-prediction modes. For example, intra-prediction processing unit 46 may be configured with a certain number of directional prediction modes, e.g., thirty-three directional prediction modes, based on the size of the CU being encoded.

Intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction processing unit 46 may calculate an error value for the prediction mode based on pixel differences between the PU and the received block to be encoded. Intra-prediction processing unit 46 may continue testing intra-prediction modes until an intra-prediction mode that yields an acceptable error value is discovered. Intra-prediction processing unit 46 may then send the PU to summer 50.

Video encoder 20 forms a residual block by subtracting the prediction data calculated by motion compensation unit 44 or the intra-prediction processing unit 46 from the original video block being coded. Summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

Transform processing unit 52 may form one or more transform units (TUs) from the residual block. Transform processing unit 52 selects a transform from among a plurality of transforms. The transform may be selected based on one or more coding characteristics, such as block size, coding mode, or the like. Transform processing unit 52 then applies the selected transform to the TU, producing a video block comprising a two-dimensional array of transform coefficients.

Transform processing unit 52 may send the resulting transform coefficients to quantization unit 54. Quantization unit 54 may then quantize the transform coefficients. Entropy encoding unit 56 may then perform a scan of the quantized transform coefficients in the matrix according to a scanning mode. This disclosure describes entropy encoding unit 56 as performing the scan. However, it should be understood that, in other examples, other processing units, such as quantization unit 54, could perform the scan.

Once the transform coefficients are scanned into the one-dimensional array, entropy encoding unit 56 may apply entropy coding such as CABAC, syntax-based context-adaptive binary arithmetic coding (SBAC), Probability Interval Partitioning Entropy (PIPE), or another entropy coding methodology to the coefficients. Entropy encoding unit 56 may be configured to code the transform coefficients. To perform CABAC, entropy encoding unit 56 may select a context model to apply to a certain context to encode symbols to be transmitted. Following the entropy coding by entropy encoding unit 56, the resulting encoded video may be transmitted to another device, such as video decoder 30, or archived for later transmission or retrieval.

In some cases, entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame buffer 64. The reconstructed video block may be used by motion estimation unit 42 and motion compensation unit 44 as a reference block to inter-code a block in a subsequent video frame.

Flicker detection unit 43 is configured to perform flicker detection and/or mitigation techniques in accordance with any of the techniques of this disclosure. Flicker detection unit 43 may access a current picture and a next picture in the display order from reference frame buffer 64 or from video data memory 39. Flicker detection unit 43 may also be configured to indicate or restrict a particular video coding mode or coding tools by signaling mode select unit 40.

Flicker detection unit 43 may also be configured to signal entropy encoding unit 56 to CABAC encode information, such as syntax elements, to entropy encoding unit 56. Such information may include a flag syntax element, indicating whether a particular region will flicker, as some examples. In other examples, flicker detection unit 43 may signal context information for CABAC encoding of syntax elements to entropy encoding unit 45.

As described above, flicker detection unit 43 may use different metrics to determine that a block of $B_{current}$ may flicker. Examples of flicker detection techniques that video encoder 20 may use will now be described in greater detail.

In some examples, to detect a flickering artifact, flicker detection unit 43 may calculate the gradient (edge information) for each luminance sample of $B_{current}$. If the samples of the current picture are in RGB (red, green, blue) format, flicker detection unit 43 may convert the picture to YCbCr format and store the picture in video data memory 39. Alternatively, flicker detection unit 43 may use the G component as a proxy for the luminance component. In some examples, flicker detection unit 43 may use a Sobel edge detector to determine the gradient. However, flicker detection unit 43 may use any other gradient calculator to determine a gradient. Based on the gradient magnitudes, flicker detection unit 43 may calculate the average of the gradient magnitude (avgGradMag) and the standard deviation of the gradient magnitude (stdDevGradMag) for the block.

Additionally, flicker detection unit 43 may calculate the percentage of samples in the block with the gradient magnitude above a given threshold (EDGE_THRESHOLD). The percentage of samples above the threshold is denoted edgePixelPercentage in these examples. Flicker detection unit 43 may then classify the block as either an edge block or a texture block based on the percentage of samples above or below the threshold.

Flicker detection unit 43 classifies the block as an edge block if the edgePixelPercentage is above a threshold (EDGE_PERCENT_THRESHOLD). Flicker detection unit 43 classifies the block as a texture block ifavgGradMag is greater than a threshold (TEXTURE_LOW_THRESHOLD), stdDevGradMag is less than a threshold (TEXTURE_HIGH_THRESHOLD) and the ratio between the stdDevGradMag and avgGradMag is less than a threshold (RATIO_TEXTURE_THRESHOLD).

Flicker detection unit 43 may also determine a palette size for the block, and use the palette size as part of a flicker determination process in accordance with the techniques of this disclosure. The palette size for a block is defined as the number of distinct pixel values in a block. Flicker detection unit 43 may consider all the components of the pixel (e.g. RGB or YUV) when determining whether the pixel values are distinct. Some deviation from a pixel value in the palette may be possible. For example, if two pixels are such that the individual components differ by less than a threshold value, or the overall sum of absolute differences differs by less than another threshold value, flicker detection unit 43 may consider those pixels as identical and corresponding to a single entry in the palette. The criterion includes both a threshold on individual component differences as well as a threshold on the overall sum of absolute differences.

A process for encoding the flickering flag based on the sum of absolute differences, and palette size will now be described. As a first step, flicker detection unit 43 may calculate the SAD between original blocks $B_{current}$ and $B_{next}$. If the SAD is greater than a threshold (SAD_THRESHOLD), flicker detection unit 43 marks the block as non-flickering.

If the cumulative SAD for the current picture up to the current block is less than a threshold (CUM_SAD_THRESHOLD), flicker detection unit 43 marks the block as non-flickering. If the SAD is less than SAD_THRESHOLD and either: (1) the palette size is greater than a threshold palette size (PALETTE_THRESHOLD), and the block is an edge block; or (2) the block is a texture block, flicker detection unit 43 marks the block as a flickering block. Otherwise, i.e. if the above conditions are not met, motion estimation unit 42 marks the block as a non-flickering block.

In the above examples, flicker detection unit 43 may use other measures of distortion, such as MSE instead of SAD. In some cases, motion estimation unit 42 may apply SAD or other measures of distortion to pixel values, such as luma or chroma values, RGB, or YUV values, as examples. Even though the techniques above techniques for flicker detection use criteria based on the palette size and measures to determine whether the block is an edge block and a texture block, it is possible to use only some of the above criteria. Flicker detection unit 43 may also use other measures to determine whether a block is a texture block or an edge block based on gradient or other criteria.

Furthermore, flicker detection unit 43 may apply additional constraints to mitigate flickering. In one example, video encoder 20, and in particular flicker detection unit 43, may disable RDOQ (rate-distortion optimized quantization) for the flickering region.

In other examples of flicker mitigation, flicker detection unit 43 may signal entropy encoding unit 56 to perform bypass the encoding of a flickering region, and may encode the information, such as block mode, transform size, and coefficient levels, of the same region in the previous I-frame so that the reconstruction of the flickering region in the current frame is exactly the same as that in the previous I-frame.

Flicker detection unit 43 may also be configured to modify CABAC encoding processes to perform flicker mitigation. As an example, flicker detection unit 43 may signal entropy encoding unit 56 to reset the status of certain CABAC context models, such as contexts related to coefficient coding, for the flickering region. Flicker detection unit 73 and entropy decoding unit 70 of video decoder 30, illustrated in FIG. 3, may be configured to perform a generally reciprocal process of resetting CABAC context models during CABAC decoding.

In some examples of flicker mitigation involving CABAC, flicker detection unit 43 may signal entropy encoding unit 56 may use the flickering flag of a left spatially-neighboring block relative to the block of the current picture as the only context for CABAC coding. Flicker detection unit 73 and entropy decoding unit 70 of video decoder 30 may perform a generally reciprocal process for CABAC decoding. In some alternatives, the context for the flickering flag may comprise other information signaled in the bitstream. Examples of the other information used as the CABAC context may comprise values such as CU depth, block type, transform size, or QP (quantization parameter).

In accordance with the techniques of this disclosure, video encoder 20 and video decoder 30 may be configured to: code information indicating whether a block from a current picture will flicker, wherein a determination of whether the block from the current picture will flicker is based on the block in the current picture in a display order and a collocated block from a next picture in the display order.

Figure 3:
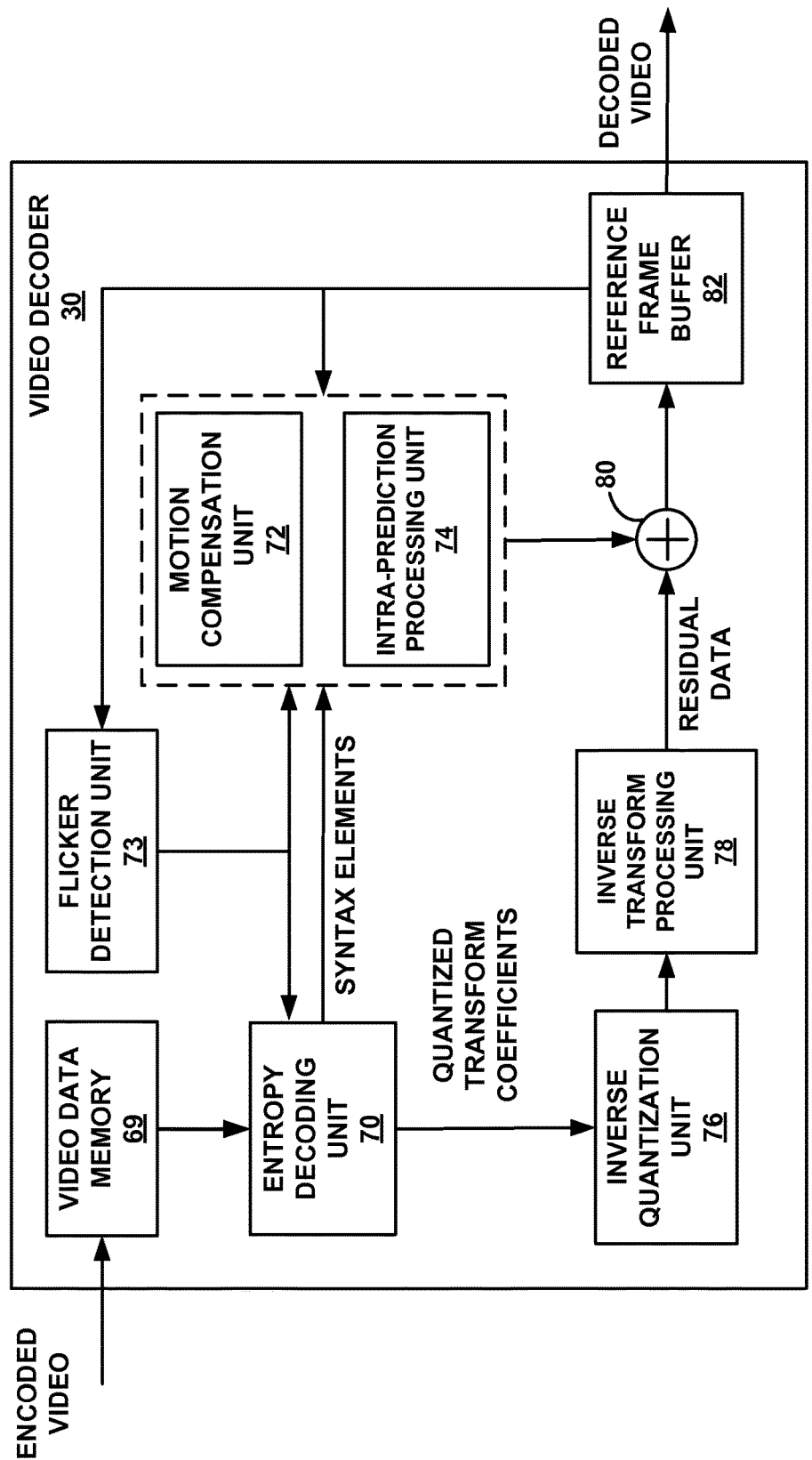
FIG. 3 is a block diagram illustrating an example video decoder that may implement the techniques described in this disclosure.

FIG. 3 is a block diagram illustrating an example of a video decoder 30, which decodes an encoded video sequence. Video decoder 30 represents an example of a device configured to perform methods for flicker detection and mitigation. In the example of FIG. 3, video data memory 69 receives encoded video. Video data memory 69 may store video data (e.g., configured to store video data), such as an encoded video bitstream, to be decoded by the components of video decoder 30. The video data stored in video data memory 69 may be obtained from a local video source, such as a camera, via wired or wireless network communication of video data, or by accessing physical data storage media. Video data memory 69 may form a coded picture buffer (CPB) that stores encoded video data from an encoded video bitstream.

Reference frame buffer 82 (also referred to as reference picture memory 82) is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

Video decoder 30 includes an entropy decoding unit 70, a motion compensation unit 72, a flicker detection unit 73, an intra-prediction processing unit 74, an inverse quantization unit 76, an inverse transformation processing unit 78, a reference frame buffer 82 and a summer 80. The video decoder 30 of FIG. 3 may, in some examples, perform a decoding pass generally reciprocal to the encoding pass described with respect to the video encoder 20 (see FIG. 2).

The entropy decoding unit 70 performs an entropy decoding process on the encoded bit stream to retrieve a one-dimensional array of transform coefficients. The entropy decoding process used depends on the entropy coding used by the video encoder 20 (e.g., CABAC). The entropy coding process used by the encoder may be signaled in the encoded bitstream or may be a predetermined process. Entropy decoding unit 70 may be configured to code the transform coefficients.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform processing unit 78 applies an inverse transform to the inverse quantized transform coefficients. In some examples, the inverse transform processing unit 78 may determine an inverse transform based on signaling from the video encoder 20, or by inferring the transform from one or more coding characteristics such as block size, coding mode, or the like. In some examples, the inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded. The intra-prediction processing unit 74 may generate prediction data for a current block of a current frame based on a signaled intra-prediction mode and data from previously decoded blocks of the current frame.

The motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on.

Based on the retrieved motion prediction direction, reference frame index, and motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction processing unit 74, in an HEVC example, may use some of the syntax information (e.g., provided by a quadtree) to determine sizes of LCUs used to encode frame(s) of the encoded video sequence. The motion compensation unit 72 and the intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. If desired, a deblocking filter may also be applied to filter the decoded blocks in order to remove blockiness artifacts. The decoded video blocks are then stored in the reference frame buffer 82 (also referred to as a decoded picture buffer), which provides reference blocks for subsequent motion compensation and also produces decoded video for presentation on a display device (such as the display device 32 of FIG. 1).

Flicker detection unit 73 is configured to perform any combination of the flickering detection and/or flickering mitigation techniques in accordance with the techniques of this disclosure. Flicker detection unit 73 may access a current picture and a next picture in the display order from reference frame buffer 82 or from video data memory 69. Flicker detection unit 73 may also be configured to indicate or restrict a particular video coding mode or coding tools by signaling motion compensation unit 72 and/or intra-prediction processing unit 74.

Flicker detection unit 73 may also be configured to signal entropy decoding unit 70 to CABAC decode information, such as syntax elements, to entropy decoding unit 70. Such information may include a flag syntax element, indicating whether a particular region will flicker, as some examples. In other examples, flicker detection unit 73 may signal context information for CABAC decoding of syntax elements to entropy decoding unit 70.

As described above, video decoder 30 may apply various flickering mitigation techniques. As an example, flicker detection unit 73 may only decode the flickering flag for CUs with a specified minimum size, such as 16×16 or above. In this case, for CUs smaller than 16×16, e.g., CUs of size 8×8, flicker detection unit 73 may not decode the flickering flag. For CUs less than the minimum size, video decoder 30, and in particular flicker detection unit 73 and entropy decoding unit 70, may infer that the flickering flag is false (i.e. equal to zero). Inferring, rather than signaling the value of the flickering flag reduces the bitstream complexity and/or saves bits in some cases. In addition, video encoder 20 may encode a high-level control flag may at a sequence, picture, or slice level to indicate whether flicker mitigation is enabled for that particular level of the video data, e.g. whether flicker mitigation is enabled for the picture, slice, or sequence. In this case, flicker detection unit 73 may similarly infer the value of the flickering flag CUs, PUs, TUs, blocks, or other elements of the bitstream.

Examples described above with respect to FIG. 2 described that video encoder 20 may determine and encode value of the flickering flag. However, video decoder 30 may also determine the value of the flickering flag. For example, flicker detection unit 73 may perform the process of flicker detection to determine whether a block will flicker for every block size under certain conditions. For example, if video encoder 20 signals the flickering flag at the CU level, flicker detection unit 73 may perform flickering detection on each CU size from 64×64 to 8×8 to determine the value of the flickering flag for each block of the CU.

In still other examples, flicker detection unit 73 may also determine whether each 16×16 block is flickering. For a larger block size such as 32×32 and 64×64 block sizes, if any of the 16×16 blocks within the larger block is marked as flickering either by video encoder 20 or video decoder 30, flicker detection unit 73 may consider the larger encompassing block to also be flickering. In yet another example, it may be possible for flicker detection unit 73 to mark a 32×32 or 64×64 block as flickering only when a number of 16×16 blocks within the larger encompassing block that are flickering is above a threshold.

As described elsewhere, and in accordance with the techniques of this disclosure, flicker detection unit 73 of video decoder 30 may be configured to: code information indicating whether a block from a current picture will flicker.

A determination of whether the block from the current picture will flicker may be based on the block in the current picture in a display order and a collocated block from a next picture in the display order.

Figure 4:
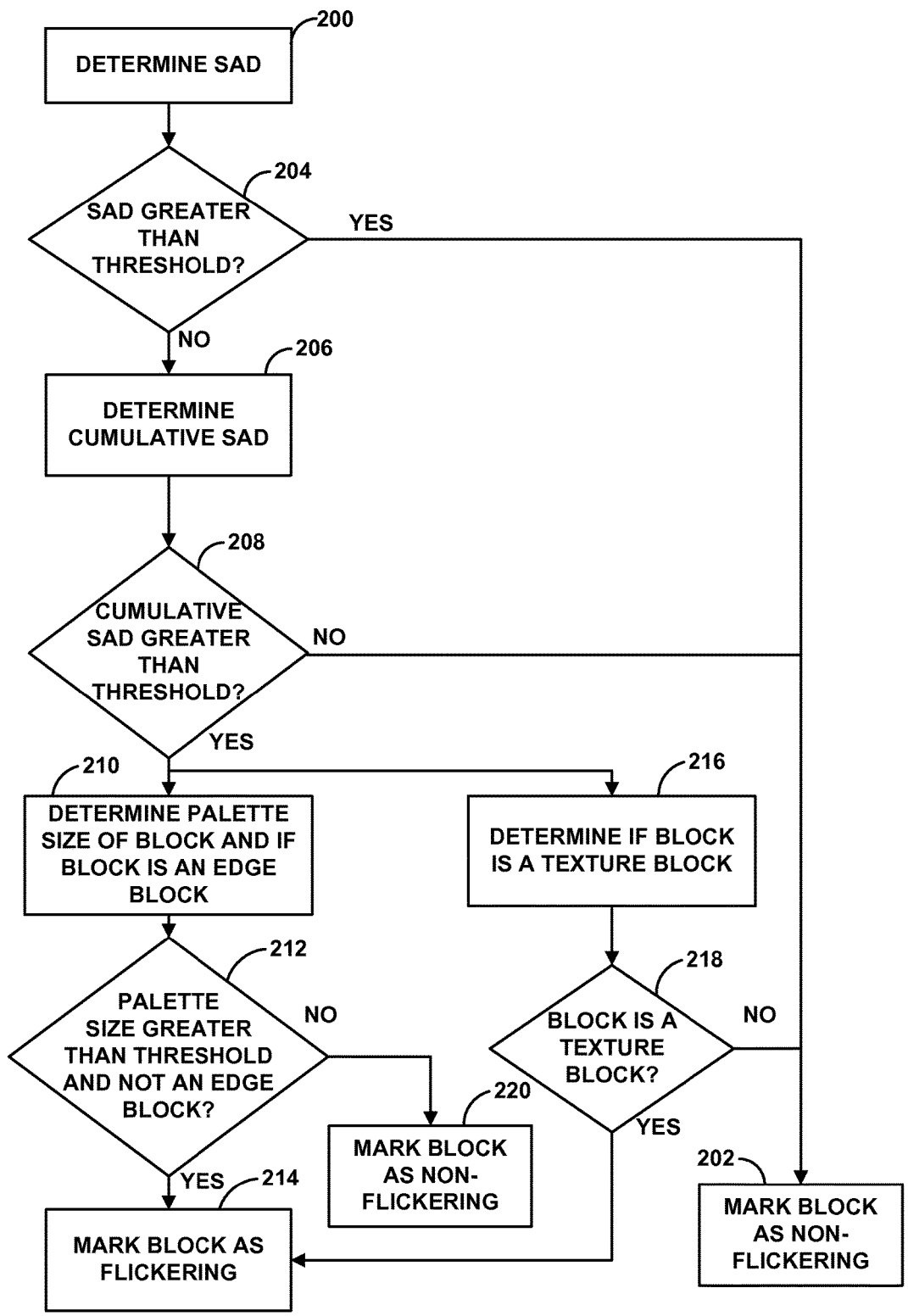
FIG. 4 is a flowchart illustrating a process for performing flicker detection in accordance with the techniques of this disclosure.

FIG. 4 is a flowchart illustrating a process for performing flicker detection in accordance with the techniques of this disclosure. It should be understood for the purposes of example that a video encoder or decoder, such as flicker detection unit 43 of video encoder 20 or flicker detection unit 73 of video decoder 30 may perform any of the techniques described herein.

In the example of FIG. 4, flicker detection unit 43 of video encoder 20 may determine a SAD (or another difference metric) between a block of a current picture and a collocated block of a next picture in display order (200). If flicker detection unit 43 determines that the SAD is greater than a threshold (YES branch of decision block 204), flicker detection unit 43 marks the current block as non-flickering (202).

If flicker detection unit 43 determines that the SAD is less than or equal to the threshold, (NO branch of decision block 204), flicker detection unit 43 determines a cumulative SAD of the current picture up to the current block (206). If the cumulative SAD is less than or equal to a threshold cumulative SAD (NO branch of 208), motion estimation unit marks the block as non-flickering (202).

If the cumulative SAD is greater than the threshold (YES branch of 208), flicker detection unit 43 determines a palette size of the block, and if the block is an edge block (210). Flicker detection unit 43 also determines if the block is a texture block (216). If the palette size of the block of the current picture is less than or equal to a threshold palette size or the block is an edge block (NO branch of 212), flicker detection unit 43 marks the block as non-flickering (220). If the palette size is greater than the palette size threshold and the block is not an edge block (YES branch of 212), flicker detection unit 43 marks the block as flickering (214).

If flicker detection unit 43 determines that the block is a texture block (YES branch of 218), flicker detection unit 43 marks the block as flickering (214). If flicker detection unit 43 determines that the block is not a texture block, (NO branch of 218), flicker detection unit 43 marks the block as non-flickering (202).

Figure 5:
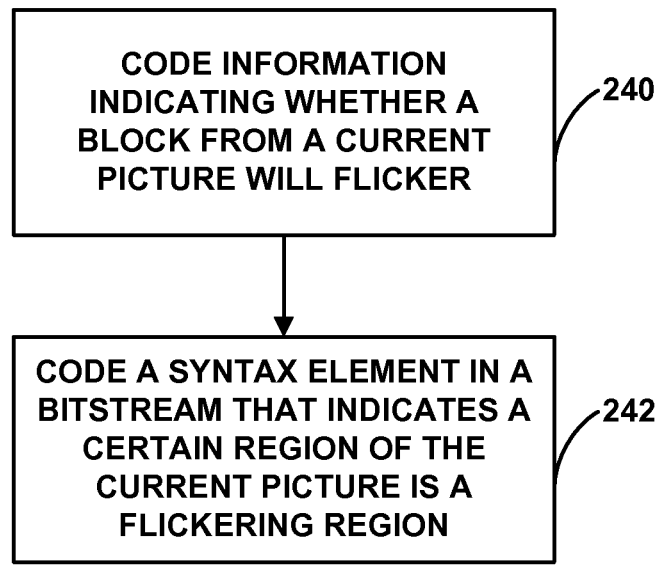
FIG. 5 is a flowchart illustrating a process for performing flicker detection in accordance with the techniques of this disclosure.

FIG. 5 is a flowchart illustrating a process for performing flicker detection and flicker mitigation in accordance with the techniques of this disclosure. It should be understood for the purposes of example that a video encoder or decoder, such as video encoder 20 or video decoder 30 may perform any of the techniques described herein.

In the example of FIG. 5, flicker detection unit 43 and entropy encoding unit 56 of video encoder 20, or entropy decoding unit 70, and flicker detection unit 73 of video decoder 30, may code information, such as a flickering flag, indicating whether a block from a current picture will flicker (240). Flicker detection unit 43 or flicker detection unit 73 may code the information indicating whether the block from the current picture will flicker based on the block in the current picture in a display order and a collocated block from a next picture in the display order. In some examples, to code the information indicating whether the block will flicker, video encoder 20 or video decoder 30 may code a syntax element in a bitstream that indicates a certain region of the current picture is a flickering region (242).

Video encoder 20 and video decoder 30 may store current picture and the next picture in the display order in video data memory 39, video data memory 69, reference frame buffer 69, and/or reference frame buffer 82. In some examples, flicker detection unit 43 or flicker detection unit 73 may be further configured to code the block based on the information indicating whether the block will flicker.

For example, flicker detection unit 43 may determine whether a block from a current picture will flicker. Flicker detection unit 43 may generate, and entropy encoding unit 56 may encode information indicating whether the block from the current picture will flicker based on the block in the current picture in a display order and a collocated block from a next picture in the display order. Flicker detection unit 43 and entropy encoding unit 56 may encode the block based on the information indicating whether the block will flicker. To encode the information indicating whether the block from the current picture will flicker, entropy encoding unit 56 may perform CABAC encoding responsive to flicker detection unit 43 generating the information.

As another example, entropy decoding unit 70 may receive information indicating whether a block from a current picture will flicker. Entropy decoding unit 70 may perform CABAC decoding on the received information responsive to receiving the information. Flicker detection unit 73 may further determine whether the block will flicker based on the block in the current picture in a display order and a collocated block from a next picture in the display order. Flicker detection unit 73 and video decoder 30 may further decode the block based on the information indicating whether the block will flicker.

In various examples, video encoder 20 and/or video decoder 30 may perform various types of processing based on the information indicating whether the block from the current picture will flicker. In some examples, video decoder 30 may perform various post-decode processing techniques.

In some examples, to code the information indicating whether the block will flicker, video encoder 20 or video decoder 30 may code a syntax element in a bitstream that indicates a certain region of the current picture is a flickering region. The block may also be within the flickering region in some examples.

In another example, to code the block, flicker detection unit 43 or flicker detection unit 73 may code the block based on constraints on coding tools for the certain region indicated to be the flickering region. The constraints may comprise disabling spatial intra prediction in the flickering region by marking a spatially-neighboring block, relative to the current block, and of the flickering region, as unavailable for intra-prediction. The constraints may also comprise marking the blocks, e.g. by flicker detection unit 43 or flicker detection unit 73, as unavailable for intra prediction in various examples.

In some examples, entropy encoding unit 56 or entropy decoding unit 70 may reset stats of CABAC context modeling for the flickering region, and code (i.e. encode or decode) the block of the current picture based on the reset status of the CABAC context modeling. To code the information indicating the picture will flicker, entropy encoding unit 56 or entropy decoding unit 70 may encode or decode a flickering flag, respectively, in various examples.

In some examples, flicker detection unit 43 may code the information indicating the block will flicker based on at least one of: a SAD between the block of the current picture and the block of the next picture, or an MSE between the current block and the next block. In still further examples, to code the information indicating that the current block will flicker, flicker detection unit 43 may code the information indicating whether the block will flicker based on whether a palette size of the block exceeds a threshold palette size when at least one of the SAD or the MSE is less than a threshold.

In various examples, to CABAC code the flickering flag, entropy encoding unit 56 or entropy decoding unit 70 may CABAC code the flickering flag using values of flickering flags of spatially-neighboring blocks relative to the block of the current picture as context for the CABAC coding.

In various examples, flicker detection unit 43 may code the information indicating whether the block from the current picture will flicker only if a CU of the region has a minimum size. In various examples flicker detection unit 43 may code the information indicating whether the block from the current picture will flicker when at least one of: a palette size of the block is greater than a threshold palette size, the block is an edge block, or the block is a texture block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

It is to be recognized that depending on the example, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, examples disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of decoding video data, the method comprising:
   extracting, by a video decoding device and from a bitstream representative of an encoded version of the video data, a flickering flag indicating whether a block from a current picture will flicker, wherein a determination of whether the block from the current picture will flicker is based on the block in the current picture in a display order and a collocated block from a next picture in the display order, and wherein the flickering flag is determined based on, when at least one of a sum of absolute differences (SAD) between the block from the current picture and the block from the next picture, and a mean squared error (MSE) between the block from the current picture and the block from the next picture is less than a threshold, whether a palette size of the block from the current picture exceeds a threshold palette size;
   decoding, by the video decoding device, the flickering flag;
   determining, by the video decoding device and based on the decoded flickering flag, that decoding tools used for decoding the block from the current frame will be constrained during decoding of the block from the current frame; and
   decoding, by the video decoding device and using the determined decoding tools, the block from the current picture.

2. The method of claim 1, wherein decoding the flickering flag comprises context adaptive binary arithmetic coding (CABAC) decoding the flickering flag.

3. The method of claim 2, wherein CABAC decoding the flickering flag comprises CABAC decoding the flickering flag using values of flickering flags of spatially-neighboring blocks relative to the block from the current picture as contexts for the CABAC coding.

4. The method of claim 1, wherein the flickering flag is coded only when a coding unit (CU) of the region has a minimum size.

5. The method of claim 1, wherein the flickering flag is further determined based on whether the collocated block was marked as flickering.

6. The method of claim 1,
   wherein decoding the flickering flag comprises decoding a flickering flag syntax element in a bitstream, the flickering flag syntax element indicating that a certain region of the current picture is a flickering region, and
   wherein the block is within the flickering region.

7. The method of claim 6, further comprising:
   resetting a status of CABAC context modeling for the flickering region; and
   decoding the block from the current picture based on the reset status of the CABAC context modeling.

8. The method of claim 6, wherein the constraints comprise disabling spatial intra prediction in the flickering region by marking a spatially-neighboring block, relative to the block from the current picture, and of the flickering region, as unavailable for intra prediction.

9. The method of claim 6, wherein the constraints comprise marking blocks inside the flickering region as unavailable for intra prediction.

10. A device for decoding video data comprising:
    a memory configured to store a bitstream representative of an encoded version of the video data; and
    at least one processor configured to:
    extract, from the bitstream, a flickering flag indicating whether a block from a current picture will flicker, wherein a determination of whether the block from the current picture will flicker is based on the block in the current picture in a display order and a collocated block from a next picture in the display order, and wherein the flickering flag is determined based on, when at least one of a sum of absolute differences (SAD) between the block from the current picture and the block from the next picture, and a mean squared error (MSE) between the block from the current picture and the block from the next picture is less than a threshold, whether a palette size of the block from the current picture exceeds a threshold palette size;
    decode the flickering flag;
    determine, based on the decoded flickering flag, that decoding tools used for decoding the block from the current frame will be constrained during decoding of the block from the current frame; and
    decode, using the constrained decoding tools, the block from the current picture.

11. The device of claim 10,
    wherein, to decode the flickering flag, the at least one processor is configured to decode a flickering flag syntax element that indicates a certain region of the current picture is a flickering region, and
    wherein the block is within the flickering region.

12. The device of claim 11, wherein the at least one processor is further configured to:
    reset a status of CABAC context modeling for the flickering region; and
    CABAC decode the block from the current picture based on the reset status of the CABAC context modeling.

13. The device of claim 10, wherein the flickering flag is decoded only when a coding unit (CU) of the region has a minimum size.

14. A device for decoding video data, the device comprising:
    means for extracting a flickering flag indicating whether a block from a current picture will flicker, wherein a determination of whether the block from the current picture will flicker is based on the block in the current picture in a display order and a collocated block from a next picture in the display order, and wherein the flickering flag is determined based on, when at least one of a sum of absolute differences (SAD) between the block from the current picture and the block from the next picture, and a mean squared error (MSE) between the block from the current picture and the block from the next picture is less than a threshold, whether a palette size of the block from the current picture exceeds a threshold palette size;
    means for decoding the flickering flag;
    means for determining, based on the decoded flickering flag, that decoding tools used for decoding the block from the current frame will be constrained during decoding of the block from the current frame; and
    means for decoding, using the determined decoding tools, the block from the current picture.

15. The device of claim 14,
wherein the means for decoding the flickering flag further comprises means for decoding a flickering flag syntax element in a bitstream that indicates a certain region of the current picture is a flickering region, and
wherein the block is within the flickering region.

16. The device of claim 15, further comprising:
means for resetting a status of CABAC context modeling for the flickering region; and
means for CABAC decoding the block from the current picture based on the reset status of the CABAC context modeling.

17. A non-transitory computer-readable storage medium comprising instructions stored thereon that, when executed, cause at least one processor to:
extract, from a bitstream representative of an encoded version of the video data, a flickering flag indicating whether a block from a current picture will flicker, wherein a determination of whether the block from the current picture will flicker is based on the block in the current picture in a display order and a collocated block from a next picture in the display order, and wherein the flickering flag is determined based on, when at least one of a sum of absolute differences (SAD) between the block from the current picture and the block from the next picture, and a mean squared error (MSE) between the block from the current picture and the block from the next picture is less than a threshold, whether a palette size of the block from the current picture exceeds a threshold palette size;
decode the flickering flag;
determine, based on the decoded flickering flag, that decoding tools used for decoding the block from the current frame will be constrained during decoding of the block from the current frame; and
decode, using the determined decoding tools, the block from the current picture.

18. A method of encoding video data comprising:
determining, by a video encoding device, at least one of a sum of absolute differences of a sum of absolute differences (SAD) between a block from a current picture of the video data in a display order and a block from a next picture of the video data in the display order and a mean squared error (MSE) between the block from the current picture and the block from the next picture;
determining, by the video encoding device and when at least one of the SAD and the MSE is less than a threshold, whether a palette size of the block from the current picture exceeds a threshold palette size;
determining, by the video encoding device and based on the determination of whether the palette size of the block from the current picture exceeds the threshold palette size, a flickering flag indicative of whether the block from the current picture will flicker;
encoding, by the video encoding device and based on the determination, the flickering flag; and
generating, by the video encoding device, a bitstream to include the encoded flickering flag.

19. A device configured to encode video data, the device comprising:
a memory configured to store a block from a current picture of the video data; and
at least one processor configured to:
determine at least one of a sum of absolute differences of a sum of absolute differences (SAD) between a block from a current picture of the video data in a display order and a block from a next picture of the video data in the display order and a mean squared error (MSE) between the block from the current picture and the block from the next picture;
determine, when at least one of the SAD and the MSE is less than a threshold, whether a palette size of the block from the current picture exceeds a threshold palette size;
determine, based on the determination of whether the palette size of the block from the current picture exceeds the threshold palette size, a flickering flag indicative of whether the block from the current picture will flicker;
encode, based on the determination, the flickering flag; and
generate a bitstream to include the encoded flickering flag.

* * * * *